United States Patent
Yanase et al.

[11] Patent Number: 6,137,400
[45] Date of Patent: *Oct. 24, 2000

[54] APPARATUS AND METHOD FOR DETECTING DECREASE IN TIRE AIR-PRESSURE

[75] Inventors: Minao Yanase, Kobe; Yuji Oshiro, Kakogawa, both of Japan

[73] Assignees: Sumitomo Rubber Industries, Ltd., Hyogo-ken; Sumitomo Electric Industries, Ltd., Osaka-fu, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 09/133,834

[22] Filed: Aug. 13, 1998

[30] Foreign Application Priority Data

Aug. 22, 1997 [JP] Japan .................................. 9-226139

[51] Int. Cl.$^7$ .................................................. B60C 23/00
[52] U.S. Cl. ......................... 340/442; 340/444; 340/445; 73/146
[58] Field of Search ..................................... 340/442, 443, 340/444, 445, 446, 447, 448; 73/146, 146.2, 146.5

[56] References Cited

U.S. PATENT DOCUMENTS

| | | | |
|---|---|---|---|
| 5,497,657 | 3/1996 | Taguchi et al. | 73/146.2 |
| 5,541,573 | 7/1996 | Jones | 340/444 |
| 5,578,984 | 11/1996 | Nakajima | 340/444 |
| 5,583,483 | 12/1996 | Baumann | 340/444 |
| 5,614,882 | 3/1997 | Latarnik et al. | 340/444 |
| 5,629,478 | 5/1997 | Nakajima et al. | 73/146.2 |
| 5,675,314 | 10/1997 | Chaklader | 340/443 |
| 5,712,616 | 1/1998 | Schmitt et al. | 340/442 |
| 5,721,374 | 2/1998 | Siekkinen et al. | 73/146.2 |
| 5,721,528 | 2/1998 | Boesch et al. | 340/442 |
| 5,747,686 | 5/1998 | Nishihara et al. | 73/146.2 |
| 5,753,809 | 5/1998 | Ogusu et al. | 73/146.2 |
| 5,760,682 | 6/1998 | Liu et al. | 340/444 |
| 5,764,137 | 6/1998 | Zarkhin | 340/444 |
| 5,826,207 | 10/1998 | Ohashi et al. | 701/36 |
| 5,828,975 | 10/1998 | Isshiki et al. | 701/72 |

FOREIGN PATENT DOCUMENTS

| | | |
|---|---|---|
| 0647535 | 4/1995 | European Pat. Off. . |
| 149199 | 6/1995 | Japan . |

*Primary Examiner*—Daniel J. Wu
*Assistant Examiner*—Toan Pham
*Attorney, Agent, or Firm*—Birch, Stewart, Kolasch & Birch, LLP

[57] ABSTRACT

An apparatus for alarming decrease in tire air-pressure in which decrease in internal pressure of tires is alarmed based on rotational information obtained from tires attached to a four-wheeled vehicle. The apparatus comprises a rotational information detecting means for detecting rotational information of each tire, a memory means for storing the rotational information of each tire, a calculating means for calculating reciprocals of turning radiuses based on rotational information of tires attached to a driving shaft and judged values from the rotational information of each tire, and a determining means for determining decrease in internal pressure from a relationship between the reciprocals of the turning radiuses and judged values. Determination of decompression can be reliably performed in the proximity of a region at which the lateral axis is 0, since the judged values (DEL values) obtained while the differentiation is restricted are focused at points at which the lateral axis is 0, that is, on the vertical axis.

12 Claims, 16 Drawing Sheets

APPARATUS AND METHOD FOR DETECTING DECREASE IN TIRE AIR-PRESSURE

BACKGROUND OF THE INVENTION

1. Field of the Invention

The present invention relates to an apparatus for detecting decrease in tire air-pressure and a method thereof. More particularly, it relates to an apparatus for detecting decrease in tire air-pressure and a method thereof which is capable of reliably determining decrease in internal pressure of a tire, especially of a vehicle which is equipped with a limited slip differential device (LSD).

2. Description of Related Art

It has been conventionally known that decrease in tire air-pressure results in a smaller dynamic load radius of a tire and in a faster revolution speed than a tire of normal air-pressure. For instance, in Japanese Unexamined Patent Publication No. 149119/1995 a method has been proposed for detecting decrease in internal pressure based on relative differences in the number of revolutions of tires. Further, since the number of revolutions of tires are influenced by turning movements, acceleration/deceleration, load or speed of a vehicle, various measures have been taken to eliminate influences thereof.

However, there are vehicles today which are equipped with a limited slip differential device located at a differential gear of a driving shaft for the purpose of improving the driving performance at the time of cornering or the like. According to the mechanism of the limited slip differential device, differentiation is restricted until a differential torque exceeds a set value and the right and left driving wheels are rotated at equal speeds. Due to this arrangement, influences of decreased air-pressure are not reflected in the number of revolutions whereby decrease in pressure cannot be detected based on relative comparison of the number of revolutions.

The present invention has been made in view of these facts, and it is an object thereof to provide an apparatus for detecting decrease in tire air-pressure and a method thereof which can reliably determine a decrease in internal pressure of a tire even in a vehicle which is equipped with a limited slip differential device.

SUMMARY OF THE INVENTION

In accordance with the present invention, there is provided an apparatus for detecting decrease in tire air-pressure in which decrease in the internal pressure of tires is detected based on rotational information obtained from tires attached to a four-wheeled vehicle. The apparatus comprises a rotational information detecting means for detecting rotational information of each tire, a memory means for storing the rotational information of each tire, a calculating means for calculating reciprocals of turning radiuses based on rotational information of tires attached to a driving shaft from among the rotational information of each tire and judged values from the rotational information of each tire, and a determining means for determining decrease in the internal pressure of tires for each region of the turning radiuses from a relationship between the reciprocals of the turning radiuses and judged values.

In accordance with the present invention, there is also provided a method for detecting decrease in tire air-pressure in which decrease in the internal pressure of tires is detected based on rotational information obtained from tires attached to a four-wheeled vehicle. The decrease in internal pressure of a tire is determined for each region of the turning radiuses from a relationship between reciprocals of turning radiuses calculated from rotational information of tires attached to a driving shaft of the four-wheeled vehicle and judged values calculated from the rotational information of tires attached to the four-wheeled vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF EXPLANATION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The apparatus for detecting decrease in tire air-pressure and method thereof according to the present invention will now be explained with reference to the accompanying drawings.

Figure 1:
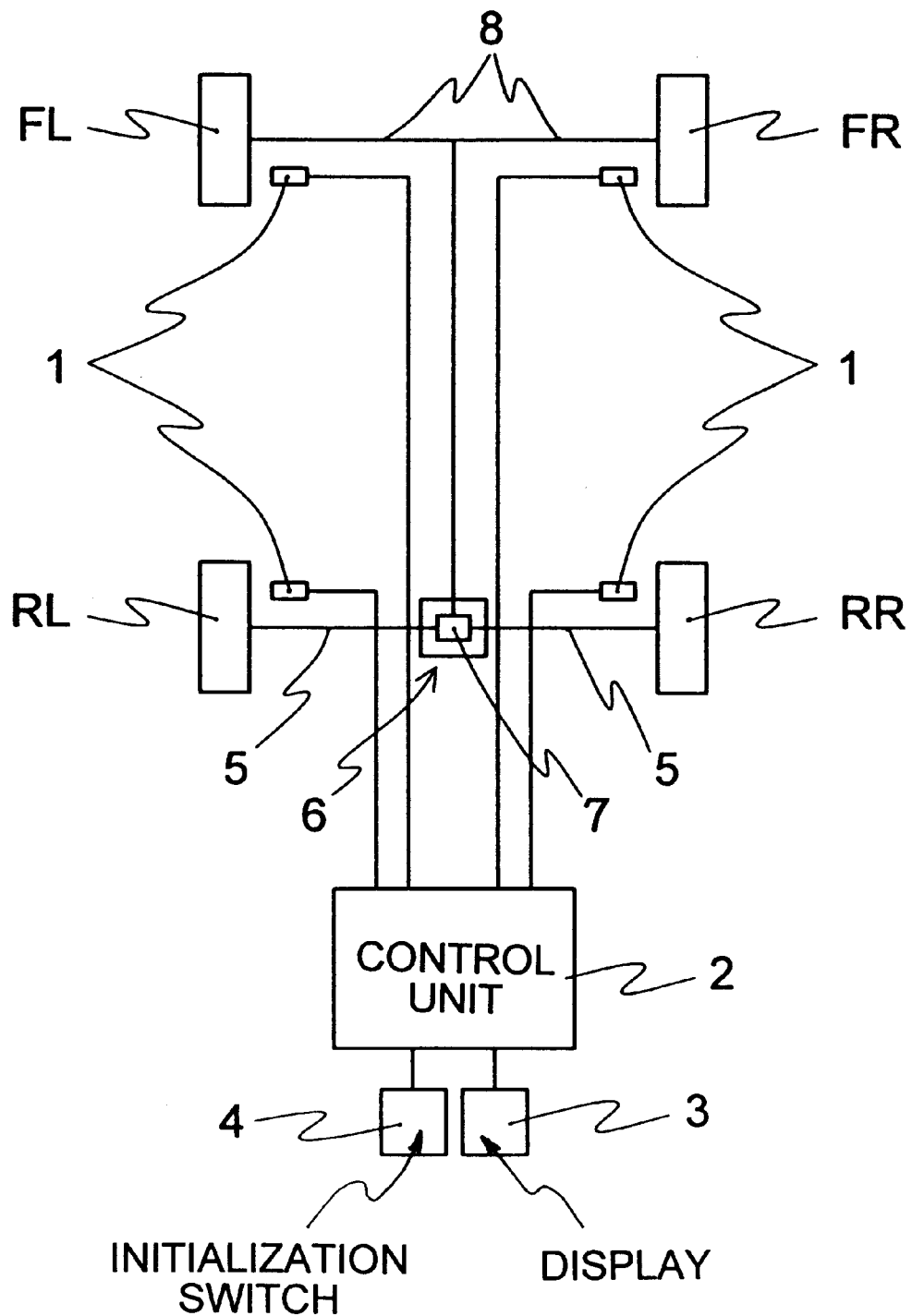
FIG. 1 is a block diagram showing an embodiment of an apparatus for detecting decrease in tire air-pressure according to the present invention.

As shown in FIG. 1, the apparatus for detecting decrease in tire air-pressure is employed for detecting whether the air-pressure of four wheels FL, FR, RL and RR attached to a four-wheeled vehicle has decreased or not. This apparatus is equipped with an ordinary wheel speed sensor 1 provided in relation to each of the tires FL, FR, RL and RR. The wheel speed sensor 1 detects rotational information of each tire such as the number of revolutions, revolution speed or angular speed. An output of the wheel speed sensor 1 is sent to a control unit 2. A display means 3 and an initialization switch 4 are connected to the control unit 2. The display means 3 includes liquid crystal display elements, plasma display elements or CRT for informing either of the tires FL, FR, RL and RR of which air-pressure has decreased. The initialization switch 4 can be operated by a driver. A limited slip differential device 7 is provided at a differential gear 6 of a driving shaft 5. It should be noted that 8 denotes a following shaft.

Figure 2:
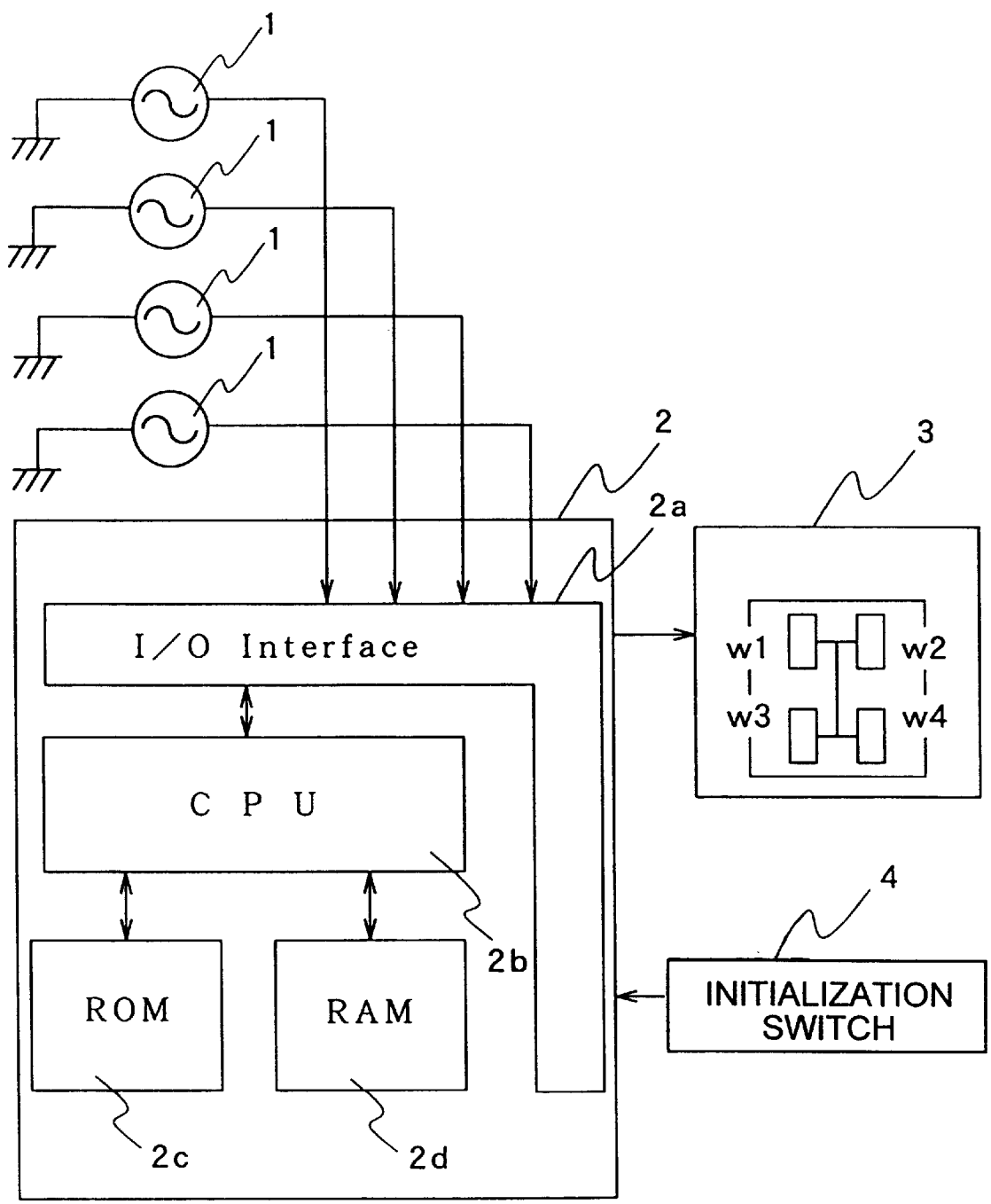
FIG. 2 is a block diagram showing electric arrangements of the apparatus for detecting decrease in tire air-pressure of FIG. 1.

As shown in FIG. 2, the control unit 2 is composed of an I/O interface 2a required for sending/receiving signals to/from an external device, a CPU 2b which functions as a center of calculation processes, a ROM 2c which stores a control operation program for the CPU 2b, and a RAM 2d to which data are temporally written in or from which written data are read out when the CPU 2b performs control operations. It should be noted that in this embodiment, the wheel speed sensor 1 functions as the rotational information detecting means and the control unit 2 as the memory means, calculating means, and determining means.

The calculating and determining processes of the present invention will now be explained wherein the judged values (DEL values) correspond to a difference in two diagonal sums.

First, since right and left driving wheels (tires) are rotated at equal speed until a turn has been made through which torque exceeding a predetermined differential limit torque is generated, the DEL value calculated from the following equation (1) is proportional only to the right and left differences of the driven wheels during this period.

$$DEL = \frac{\frac{V_{(1)} + V_{(4)}}{2} - \frac{V_{(2)} + V_{(3)}}{2}}{\frac{V_{(1)} + V_{(2)} + V_{(3)} + V_{(4)}}{4}} \quad (1)$$

Note that $V_{(x)}$: revolution speed of tire (m/sec)
x:1=front left tire, 2=front right tire, 3=rear left tire, 4=rear right tire.

Figure 3:
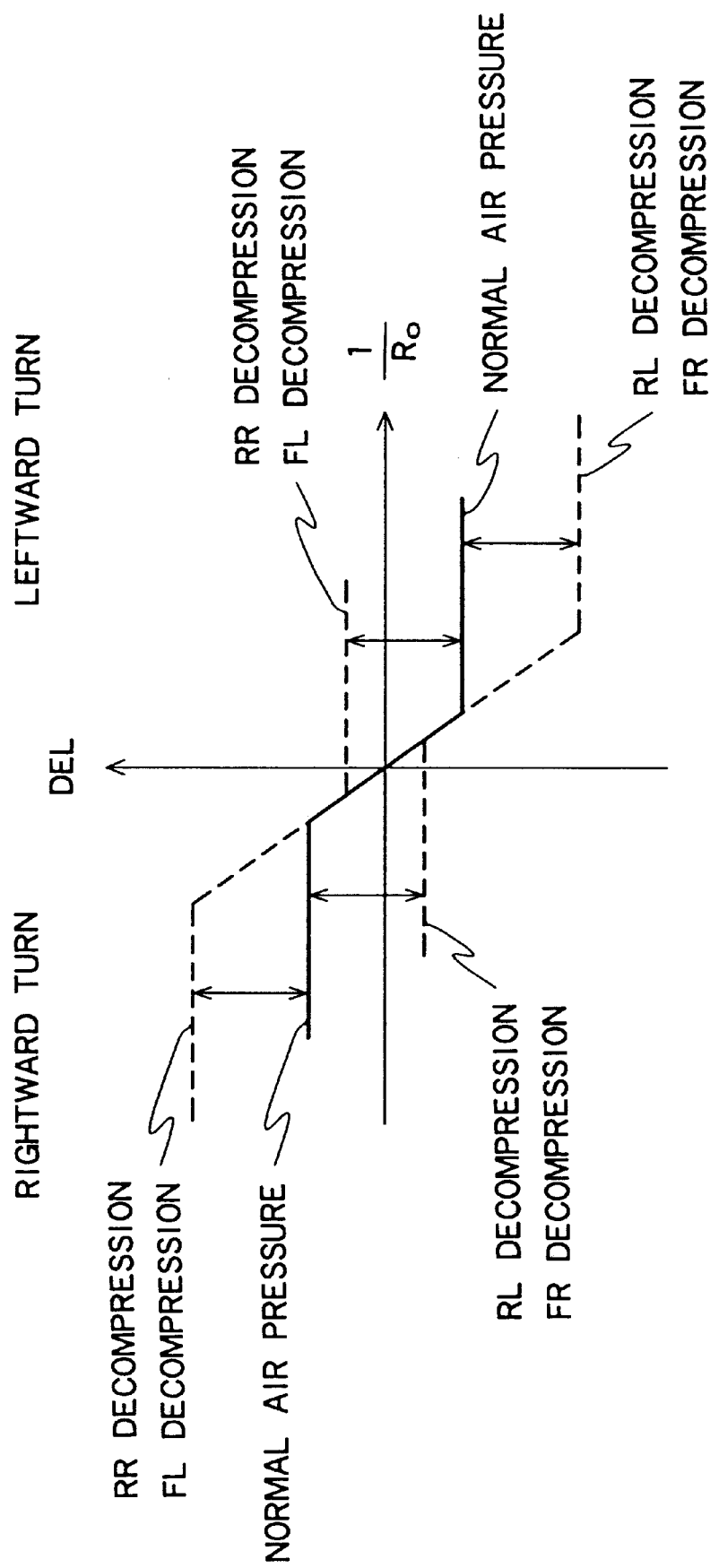
FIG. 3 is a schematic diagram showing a relationship between reciprocals of turning radiuses calculated from right and left differences of following wheels and judged values.

In other words, since the differential torque is dependent on the turning radius unless the vehicle is running on a special road surface, if a reciprocal $1/R_0$ of the turning radius $R_0$ obtained from equation (2) based on the right and left differences of the following wheels is calculated for obtaining a DEL value as a judged value for decompression, the DEL value corresponds only to the right and left differences of the driven wheels while the differential is restricted as shown in FIG. 3. Furthermore, the DEL value becomes substantially constant when exceeding a set differential torque.

$$\frac{1}{R_0} = \frac{1}{T_W} \times \frac{V_{(1)} - V_{(2)}}{V_{AVE}} \quad (2)$$

Note that $T_W$ denotes a tread width and $V_{AVE}$ an average value of right and left tires.

In the relationship between the reciprocals $1/R_0$ of the turning radiuses of the following wheels and the DEL values, decompression of the driving wheels results in a shift in the central turning radius of right and left driving wheels of which the differential is restricted. A decompression of the following wheels results in a shift of the calculation of the turning radius itself. Thus, the DEL values are moved in a parallel manner in a vertical direction along a line (diagonal line) for the right and left differences of the following wheels as shown in FIG. 3. Therefore, it is required to perform determination of decompression by comparing horizontal portions of normal air-pressure conditions and those of decompressed conditions. For this purpose, it is required to discriminate from which point the horizontal portions shall start in both conditions. However, since horizontal portions differ depending on materials, dimensions or characteristics such as rigidity of the tire, or the amount of decompression of a tire, it is quite difficult to specify such horizontal portions (ranges).

Figure 4:
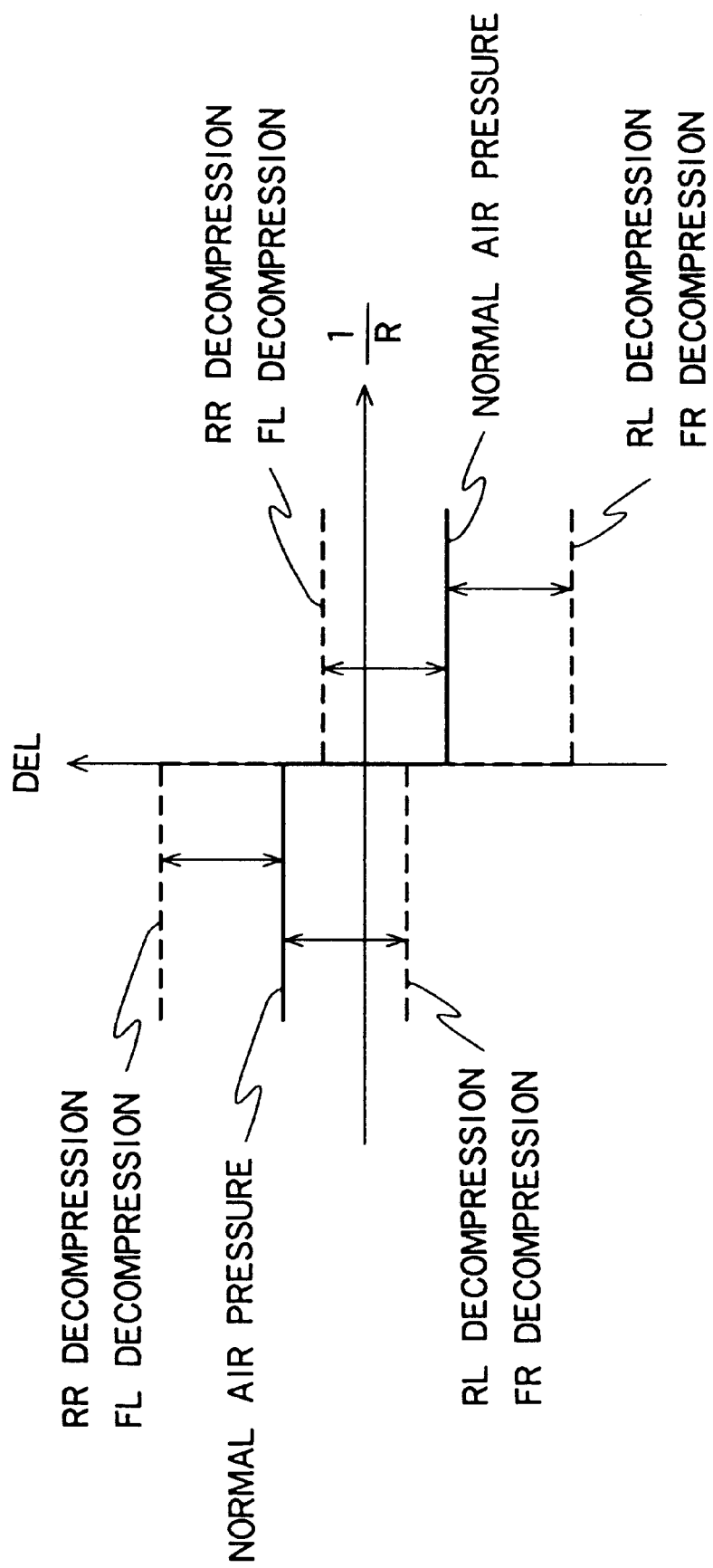
FIG. 4 is a schematic diagram showing a relationship between reciprocals of turning radiuses calculated from right and left differences of driving wheels and judged values.

In view of this point, by depicting the reciprocals $1/R_0$ of the turning radiuses R calculated from the driving shaft on the lateral axis (X-axis) in the present invention, the DEL values are focused at positions at which the lateral axis is 0, i.e. on the vertical axis (Y-axis) when the differential is restricted, regardless of the presence/absence or the position of decompression, as shown in FIG. 4. Therefore, by comparing judged values at horizontal portions somewhat remote therefrom, decompression can be easily determined.

It should be noted that although it has been described above that DEL values are horizontal when the limited slip differential device has started differentiation when a turning radius has exceeded a certain degree, these values are actually variable depending on the speed or driving force of the vehicle or lateral directional acceleration (lateral G), whereby correction is required also at this portion. For instance, load displacement at the time of turning, fluctuations in DEL values due to driving force or sensitivity correction of DEL due to speed can be corrected by preliminarily investigating the degree of influences at the time of tuning the vehicle in order to make variations in DEL values small and to improve the accuracy thereof.

The present invention will now be explained based on an example thereof while it should be noted that the present invention is not limited to only this example.

EXAMPLE

The present invention has been provided for a vehicle which is equipped with a limited slip differential device (hereinafter referred to as "LSD equipped vehicle") and to which there are attached winter tires of normal air-pressure (2.2 kg/cm$^2$). The dimension of the tires is 225/45R17.

This vehicle has been made to run on general roads in Germany including the Autobahn.

Then, a LSD equipped vehicle, of which four tires have been each decreased in air-pressure by 40%, respectively, has been made to run similarly to the vehicle with tires of normal air-pressure.

Figure 5:
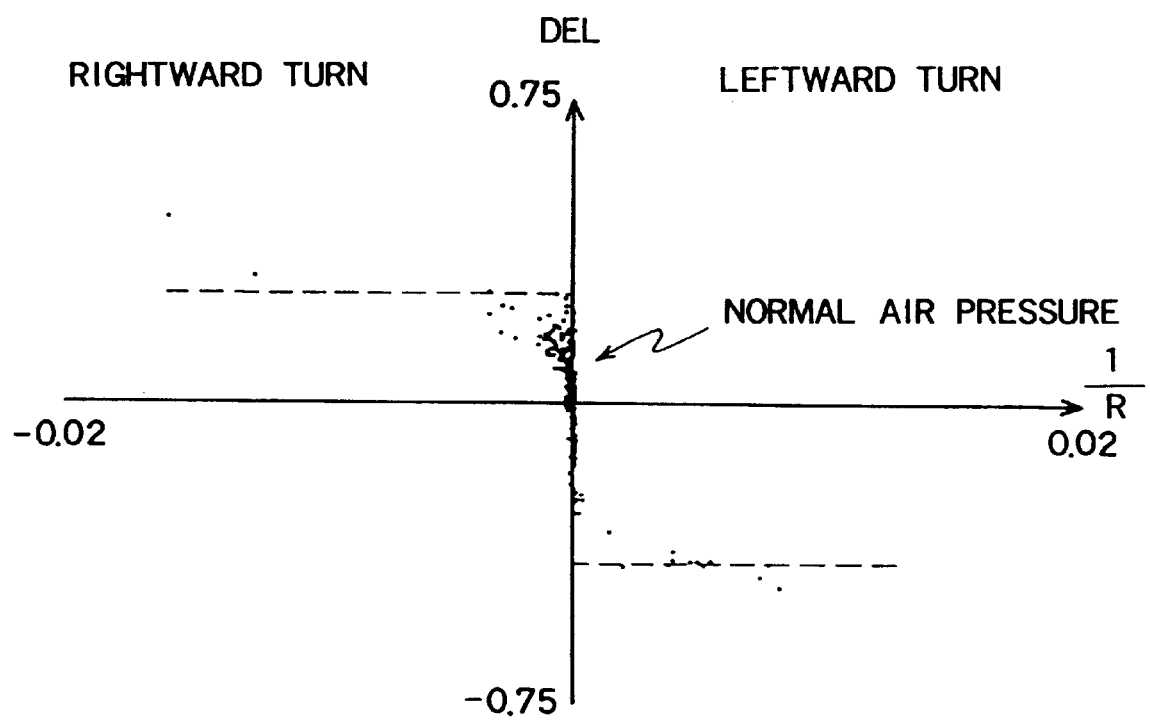
FIG. 5 is a diagram showing a relationship between reciprocals of turning radiuses and judged values of driving wheels when a vehicle is running with all four tires being of normal pressure.
Figure 6:
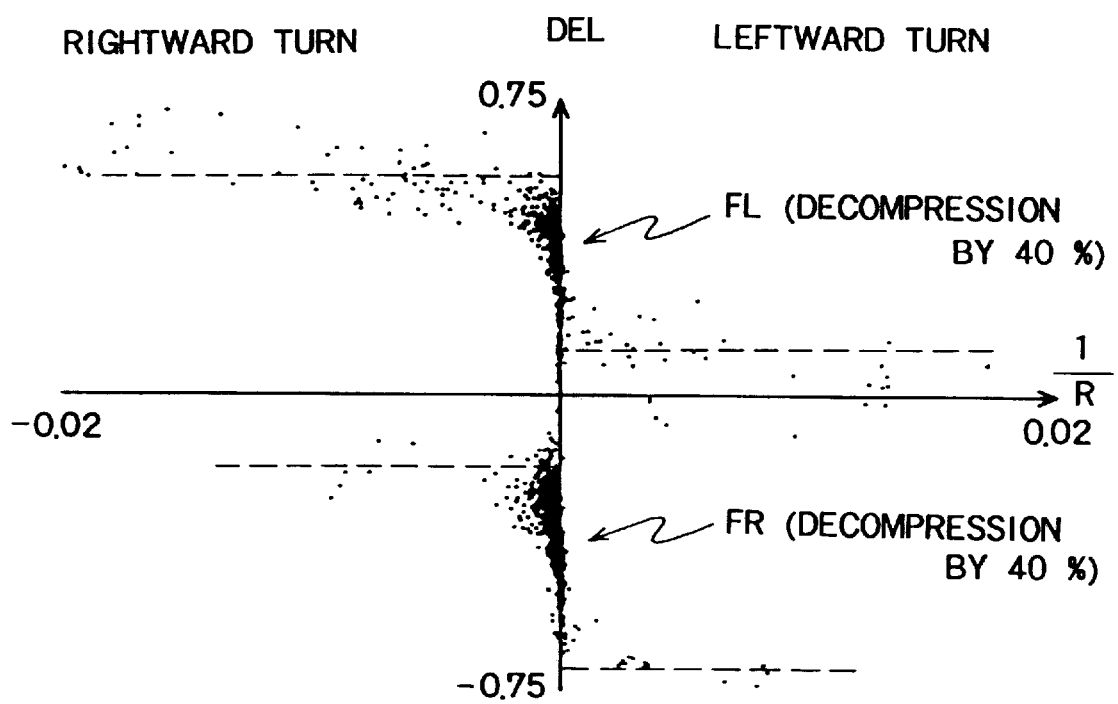
FIG. 6 is a diagram showing a relationship between reciprocals of turning radiuses and judged values of driving wheels when FL and FR are each decreased in pressure by 40%, respectively.
Figure 7:
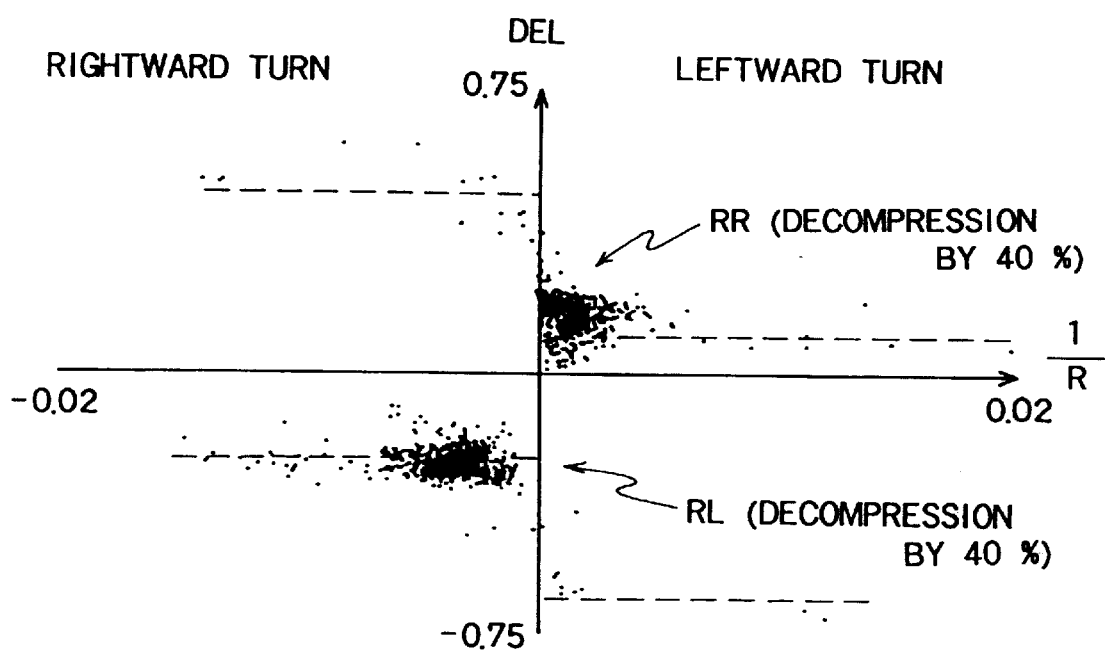
FIG. 7 is a diagram showing a relationship between reciprocals of turning radiuses and judged values of driving wheels when RL and RR are each decreased in pressure by 40%, respectively.

Reciprocals 1/R of turning radiuses R and DEL values of the driving wheels thus obtained have been respectively depicted on the lateral axis and vertical axis, respectively, and the relationship between the reciprocals 1/R of turning radiuses R and DEL values has been examined. As shown in FIGS. 5 to 7, it can be understood that data on the diagonal line of FIGS. 8 to 10 (DEL values) are focused on the vertical axis.

Then, data obtained by dividing values for 1/R into three regions and by simply averaging them are shown in Table 1.

Rightward turn: 1/R<−0.002

Straight-ahead driving: −0.002≦1/R≦0.002

Leftward turn: 1/R>0.002

TABLE 1

|  | Rightward Turn | Straight-ahead Driving | Leftward Turn |
| --- | --- | --- | --- |
| N.P. (Normal Pressure) | 0.242867 | 0.0247896 | −0.398225 |
| FL (Decompression by 40%) | 0.551041 | 0.370204 | 0.0991766 |
| Difference between FL and N.P. | 0.308172 | 0.3454144 | 0.4974016 |
| FR (Decompression by 40%) | −0.215695 | −0.371186 | −0.707161 |
| Difference between FR and N.P. | −0.458562 | −0.3959756 | −0.308936 |
| RL (Decompression by 40%) | −0.237302 | −0.275802 | −0.686021 |
| Difference between RL and N.P. | −0.480169 | −0.3005916 | −0.287796 |
| RR (Decompression by 40%) | 0.426015 | 0.16327 | 0.150903 |
| Difference between RR and N.P. | 0.183148 | 0.1384804 | 0.549128 |

Excision of horizontal portions is thus made easy, comparison with reference values at normal air-pressure (these reference values are preliminarily stored at the time of initialization) is made easy, and determination of decompression is made possible even in a LSD equipped vehicle. Further, it can be understood that determination of decompression for data on the straight-line portion, though being widely dispersed, is made possible by setting a large decompression determining threshold.

Comparative Example

Similarly to the preceding example, a relationship between reciprocals $1/R_0$ of turning radiuses and DEL values of following wheels has been obtained in case a LSD equipped vehicle has been made to run at a cornering with tires of normal air-pressure and with tires decompressed by 40%.

Figure 8:
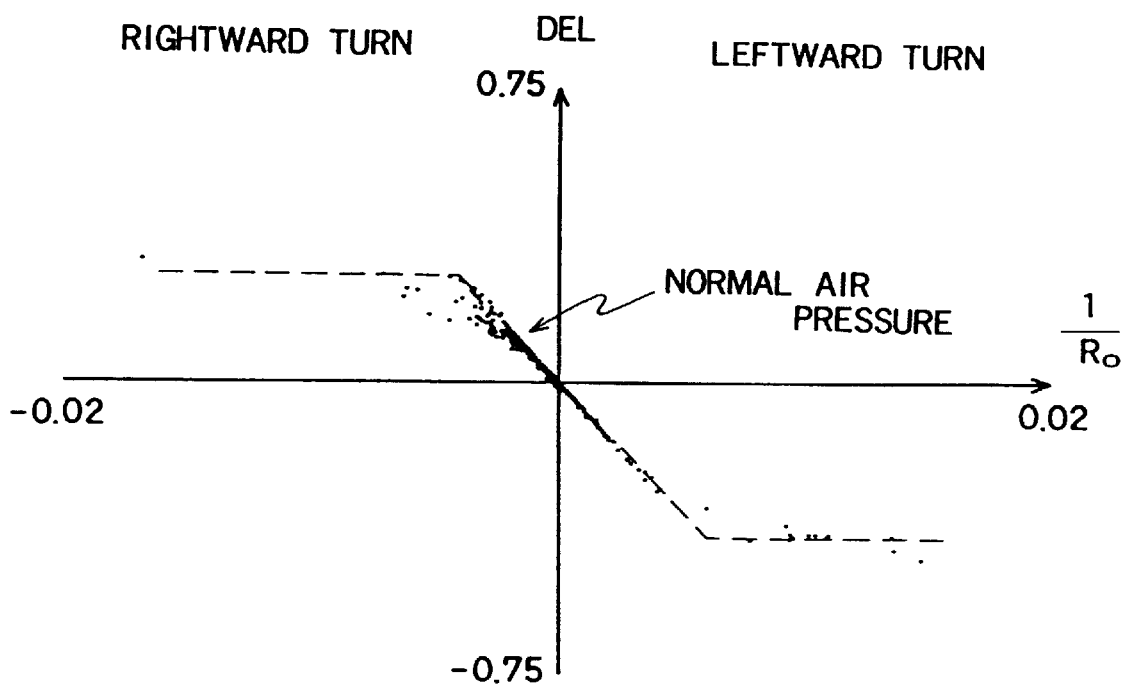
FIG. 8 is a diagram showing a relationship between reciprocals of turning radiuses and judged values of following wheels when a vehicle is running with all four tires being of normal pressure.
Figure 9:
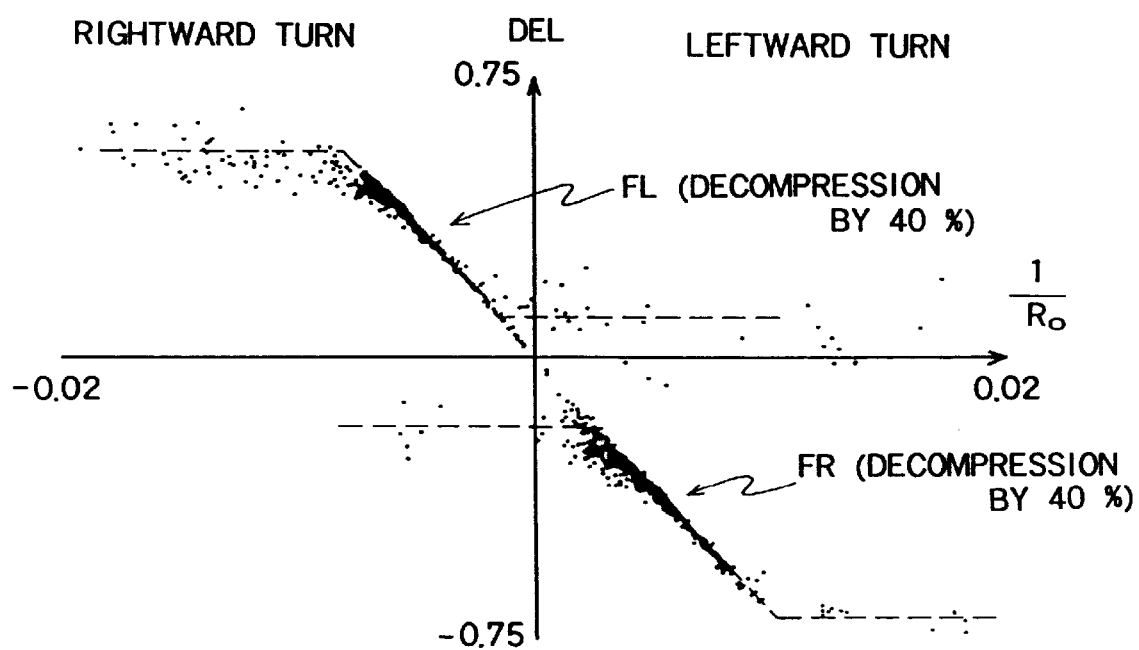
FIG. 9 is a diagram showing a relationship between reciprocals of turning radiuses and judged values of following wheels when FL and FR are each decreased in pressure by 40%, respectively.
Figure 10:
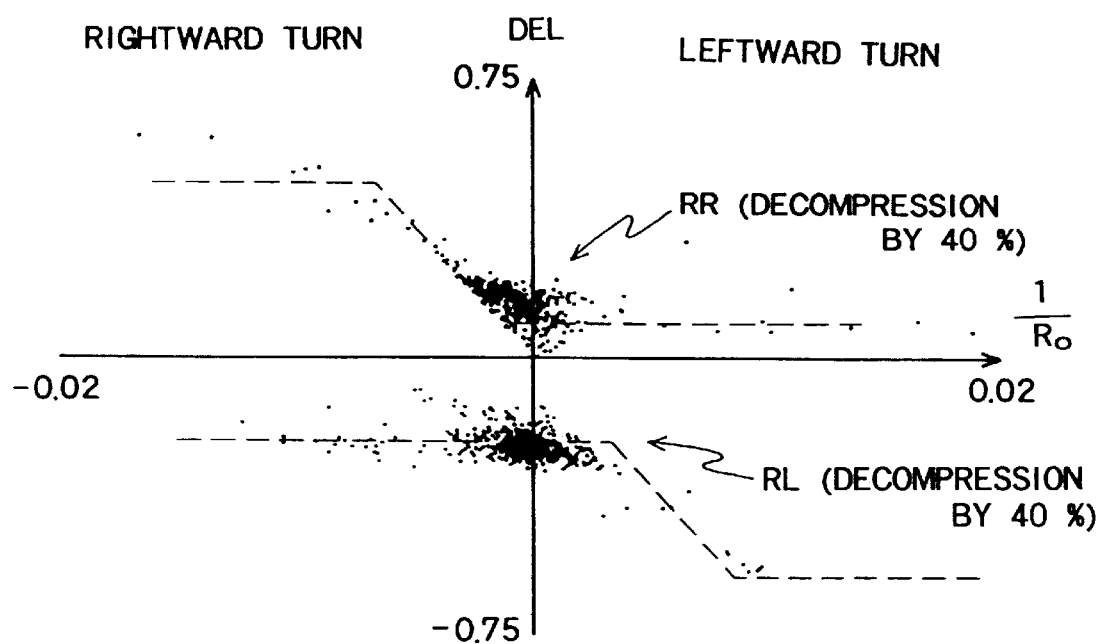
FIG. 10 is a diagram showing a relationship between reciprocals of turning radiuses and judged values of following wheels when RL and RR are each decreased in pressure by 40%, respectively.

As shown in FIGS. 8 to 10, while determination of decompression might seemingly be possible by comparing horizontal portions of both, averaged values of diagonal portions, or central values of both, determination of decompression is impossible since these portions are hard to be excised.

In the preceding example, factors of summer tires and winter tires such as cornering coefficients or speed sensitivity correction coefficients are preliminarily obtained at initialization running at the time of performing tuning of the vehicle, and averaged values thereof are employed as averaged factors. Cornering correction, for instance, is done as follows: when the lateral G becomes large during cornering, the determined value changes accompanying the increase in lateral G as shown by ◇ marks (actually measured values) in FIGS. 11 and 12 owing to factors such as load displacement or slip. Correction is performed in such a manner that a determined value obtained at the time when the lateral G is large is made equal to a determined value obtained at the time when the lateral G is small.

Figure 11:
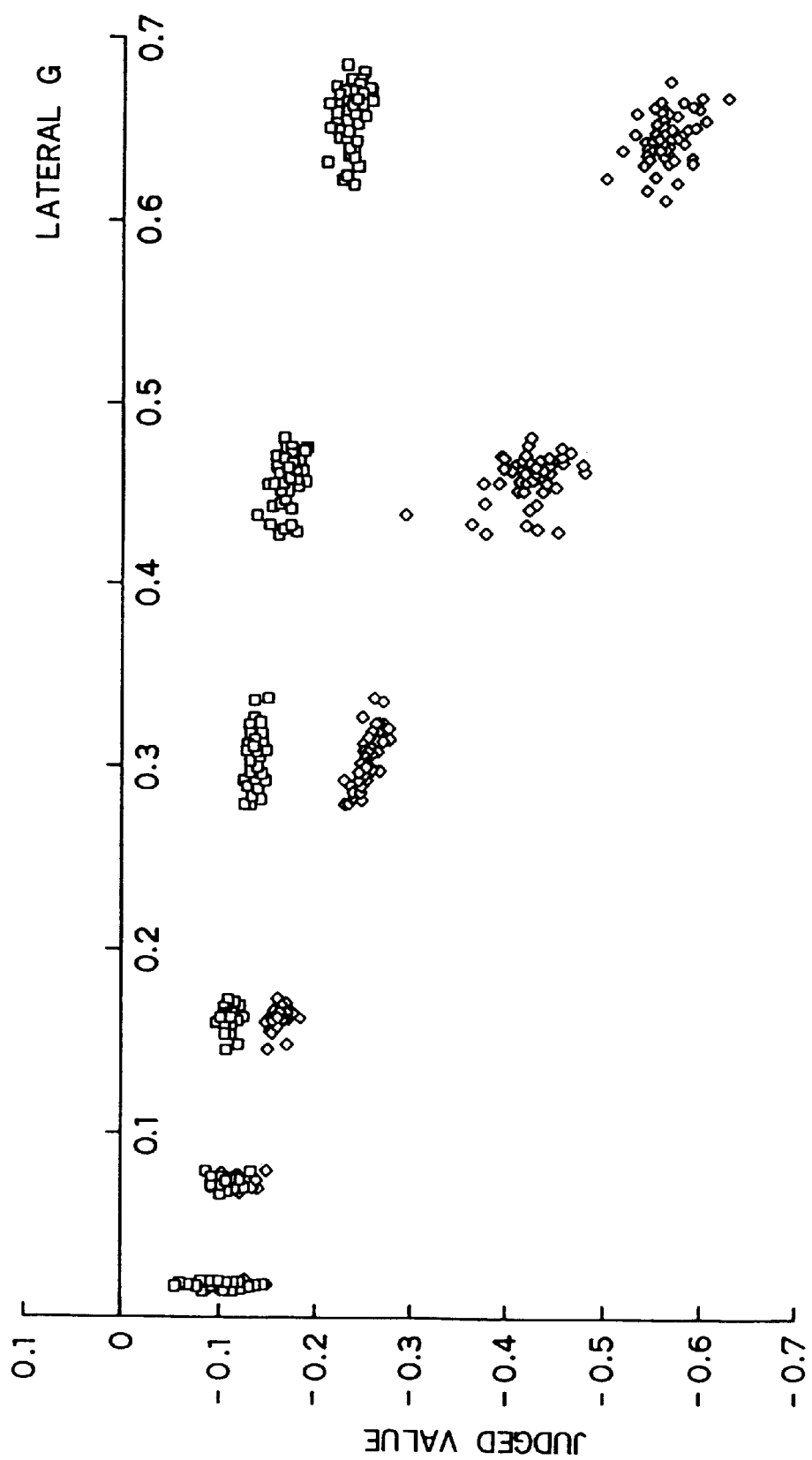
FIG. 11 is a diagram showing a relationship between lateral G and judged values of summer tires when an averaged factor is employed.
Figure 12:
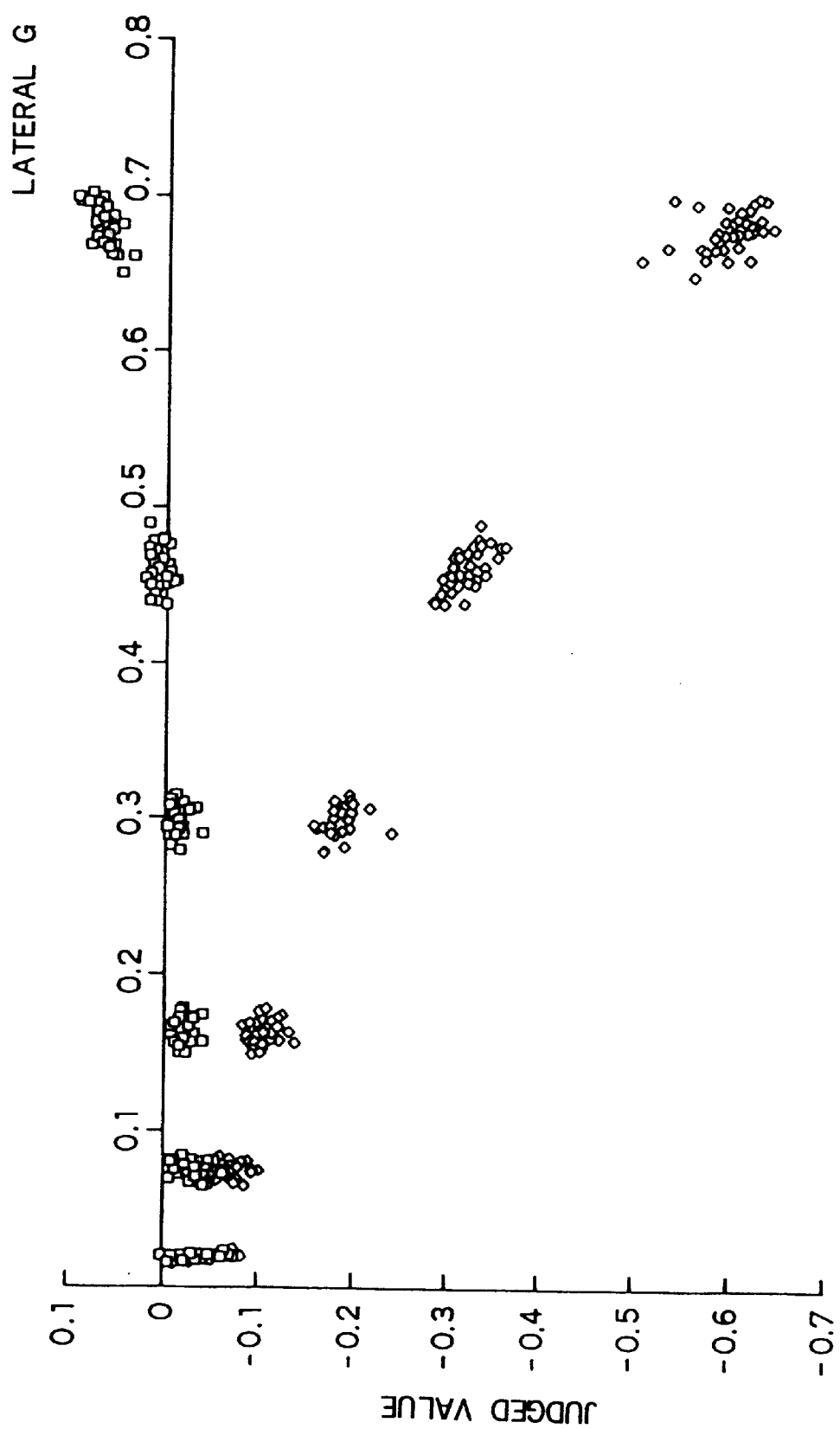
FIG. 12 is a diagram showing a relationship between lateral G and judged values of winter tires when an averaged factor is employed.

When employing such averaged factors when performing cornering correction, an increase in lateral G will result in a shortage of correction in the case of winter tires as indicated by □ marks in FIG. 11 and in an excess of correction in the case of summer tires as indicated by □ marks in FIG. 12, whereby exact correction cannot be performed. Thus, it is required to make restrictions for rejection of lateral G (threshold) strict (e.g. the thresholds for rejection of lateral G in FIGS. 11 and 12 need to be set to 0.2). Therefore, the amount of data used for determining a detection is decreased. Consequently, if initialization is performed by using averaged factors of summer tires and winter tires (correction coefficients) in the preceding example, a large amount of data needs to be obtained during actual running performed thereafter so that it might take a long time until a detection is determined.

Next, another embodiment of the present invention for improving this point will now be explained.

Figure 13:
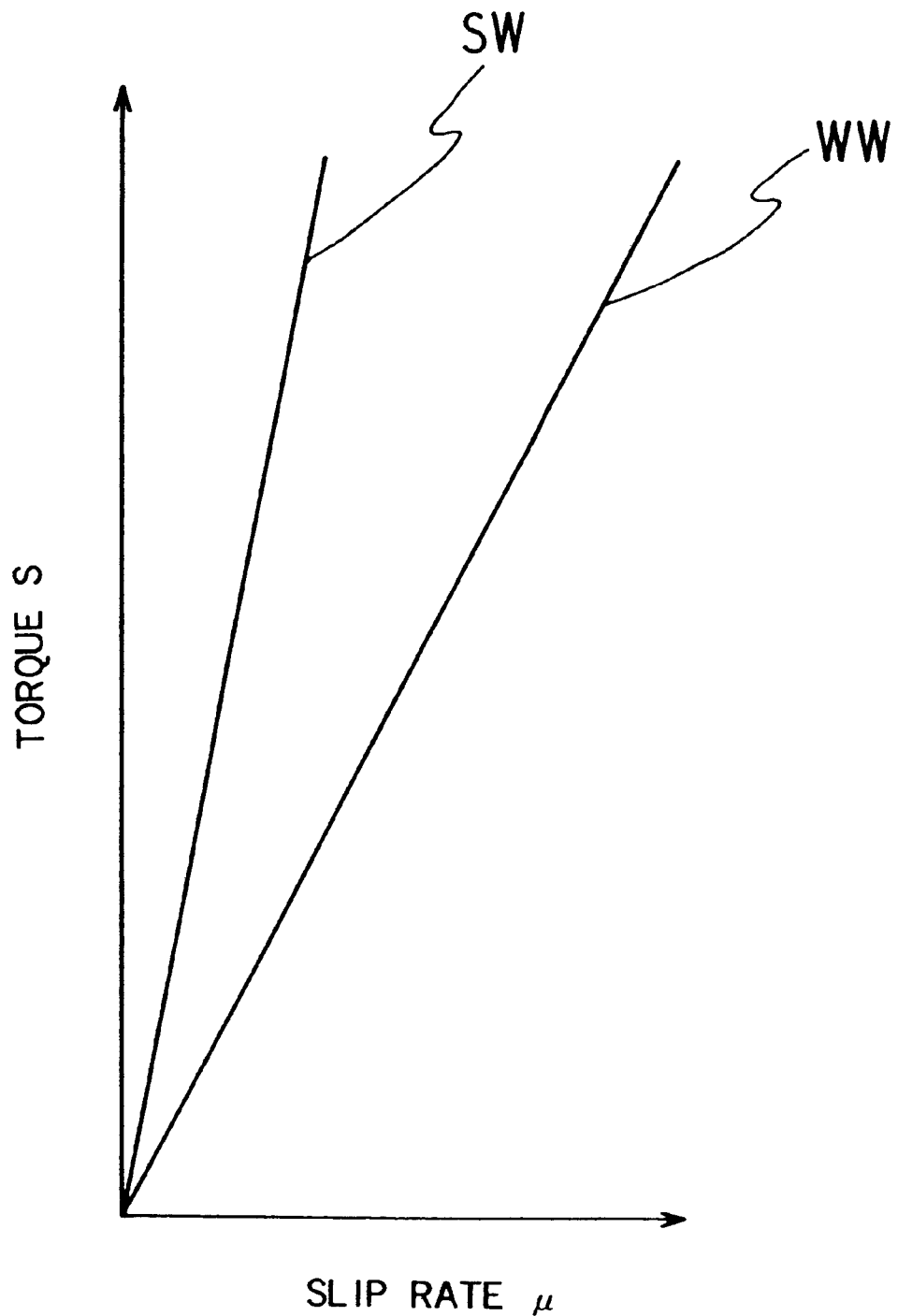
FIG. 13 is a diagram showing μ-s characteristics of summer tires and winter tires.

As shown by the schematic diagram of FIG. 13, the inclinations of μ-s characteristics (torque-slip rate characteristics) differ between summer tires SW and winter tires WW. This indicates that the slip rate of winter tires WW becomes larger when their torque are equal. In other words, it indicates that torque from the road surface is hardly transmitted since winter tires are more likely to slip.

Further, in the case of a LSD equipped vehicle with winter tires, the judged values present a hook-like configuration with respect to reciprocals of turning radiuses obtained from the driving wheels. This is because handling differences of following wheels just become judged values in the proximity of the straight line, since in a vehicle equipped with LSD, the right and left driving wheels run at equal speeds until the vehicle has turned and a specified torque difference is obtained (in the case of vehicles which are not equipped with LSD, the driving wheels will not be fixed and the judged value obtained from differences in sums of diagonal pair of wheels becomes 0). This is also due to the fact that driving wheels turn with differential differences existing when a certain torque difference is exceeded by a turning movement.

Figure 14:
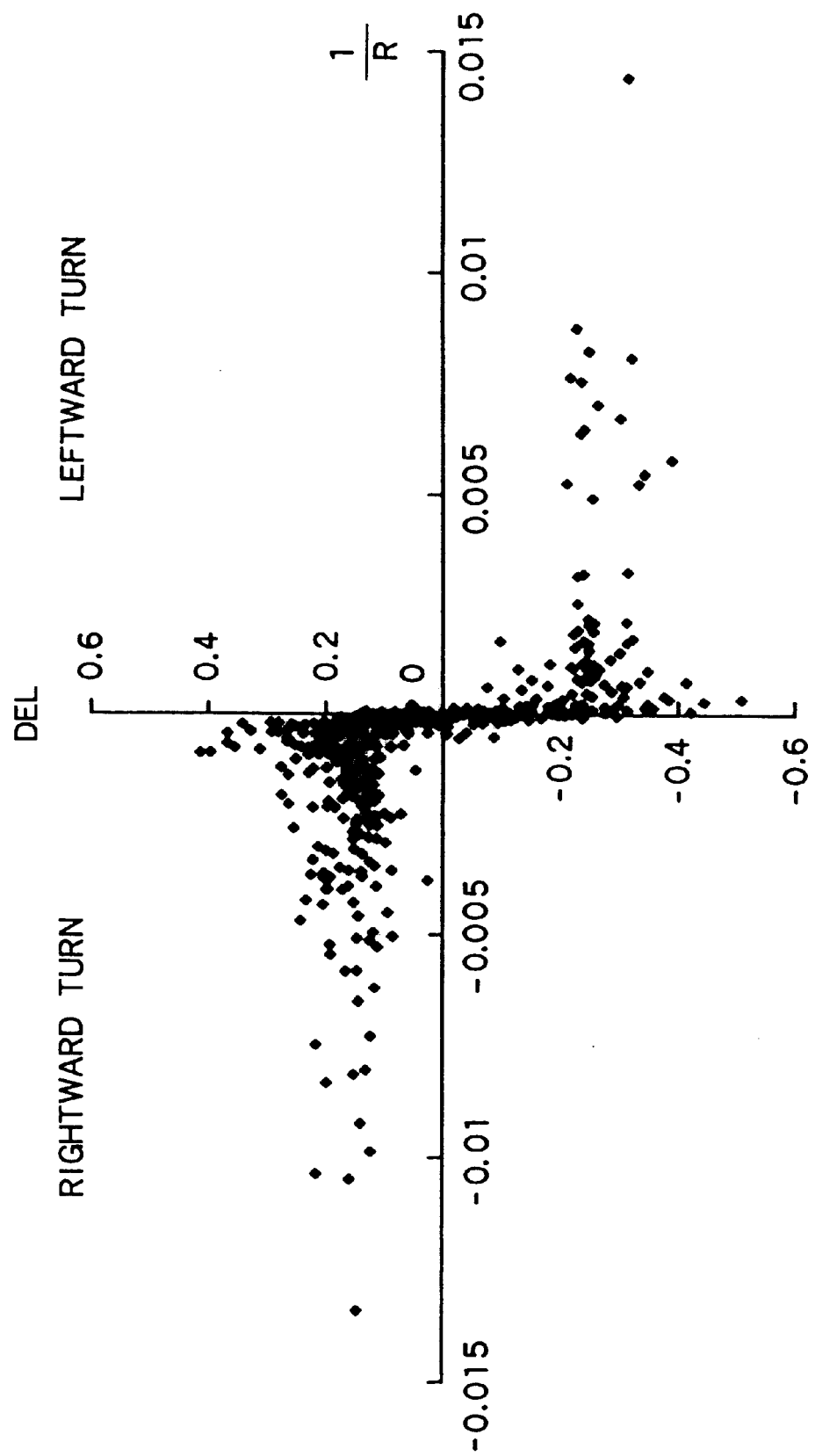
FIG. 14 is a diagram showing a relationship between reciprocals of turning radiuses and judged values of driving wheels when winter tires are employed.
Figure 15:
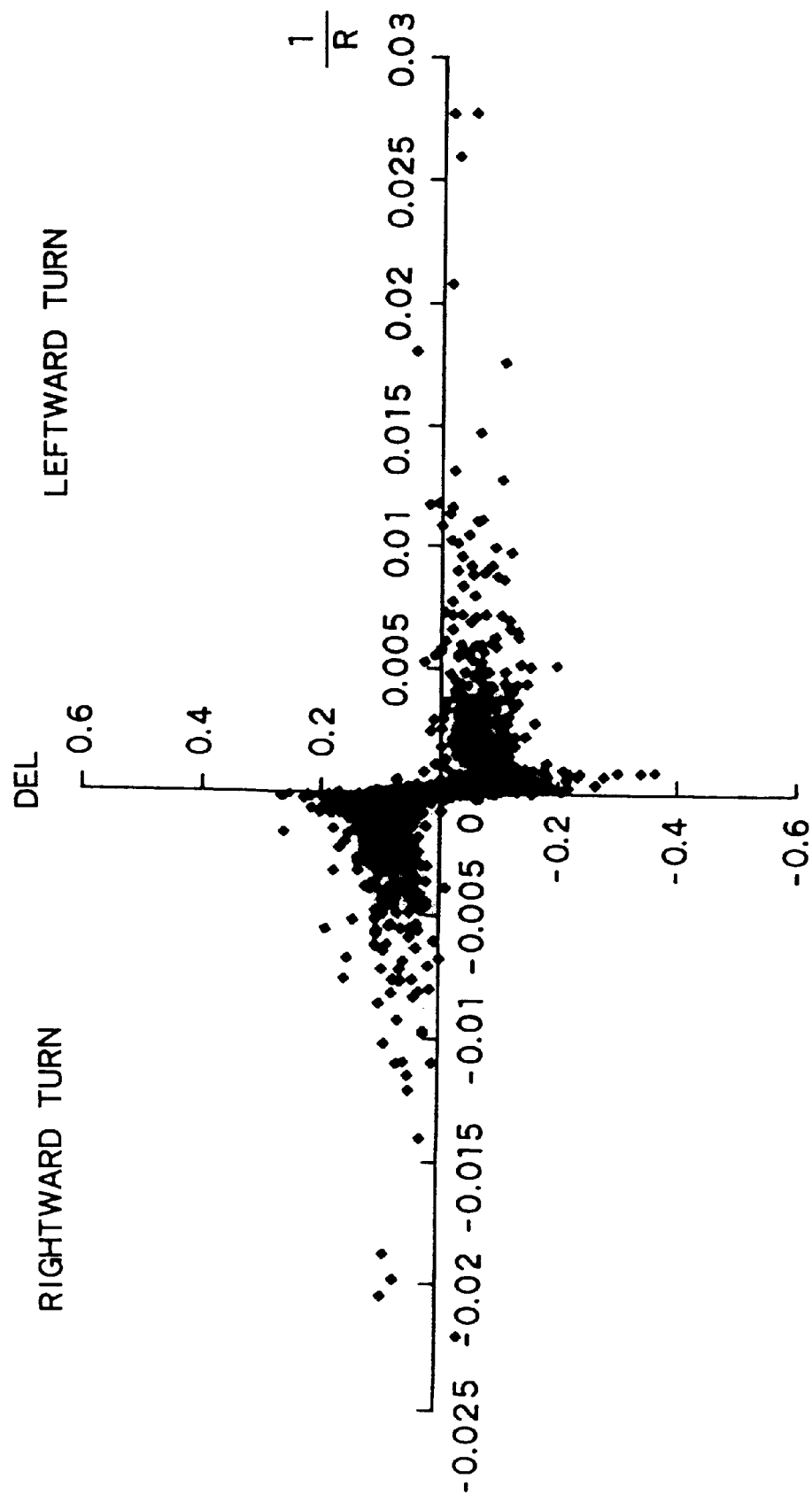
FIG. 15 is a diagram showing a relationship between reciprocals of turning radiuses and judged values of driving wheels when summer tires are employed.

Due to these two points, torque from road surfaces is more easily transmitted to summer tires, and differentiation is released since a torque difference is generated also at a large turning radius. On the other hand, no differential difference is generated unless a turning radius becomes smaller than that of summer tires since torque is difficult to transmit due to easier slipping of winter tires so that differentiation is hard to be released. Therefore, the judged values (DEL values) for winter tires in the proximity of the straight line as shown in FIG. 14 becomes larger than the judged values (DEL values) for summer tires in the proximity of the straight as line as shown in FIG. 15. It should be noted that judged values differ between left and right turns.

Figure 16:
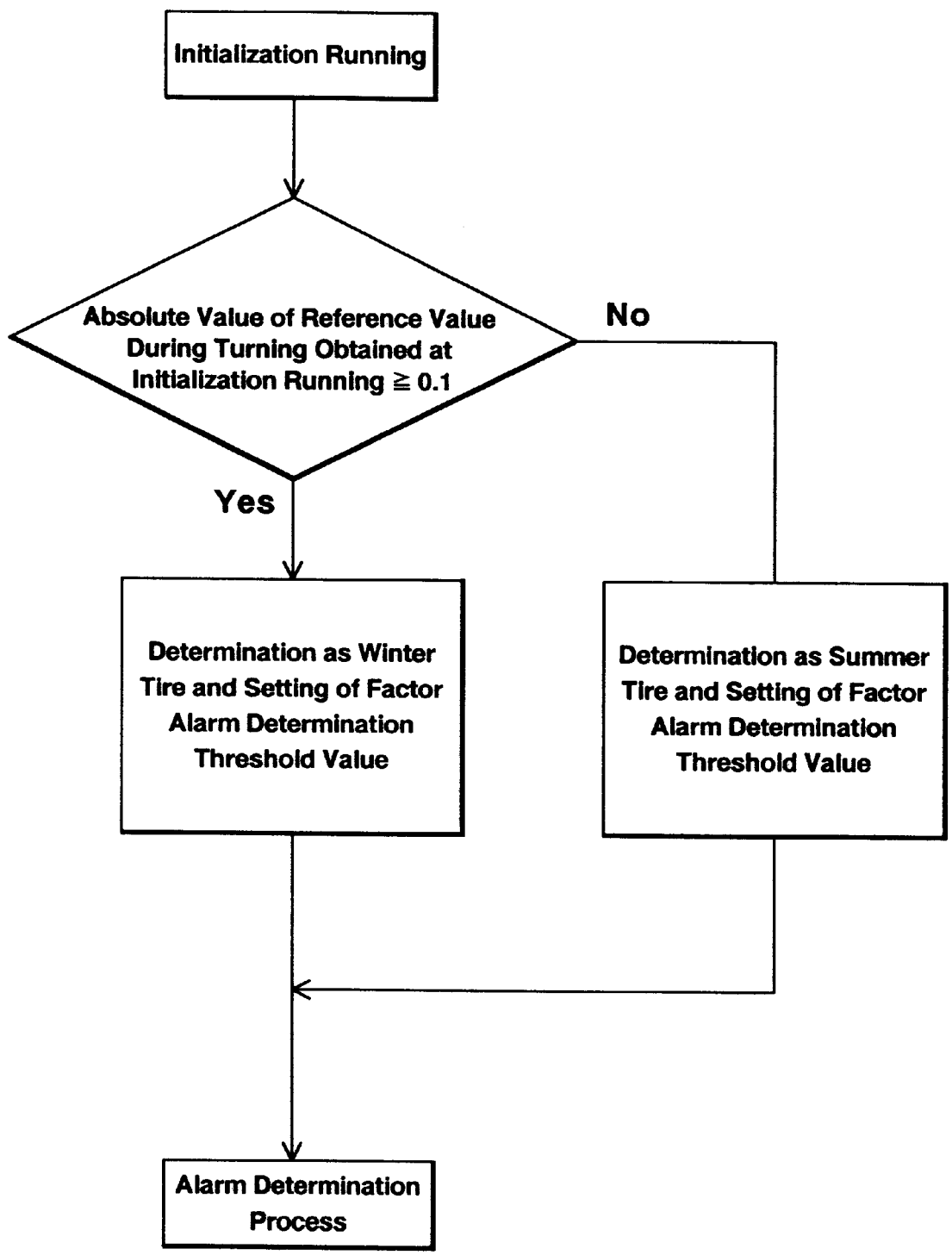
FIG. 16 is a flowchart related to another embodiment of the present invention.

Therefore, it can be understood that discrimination can be made whether these tires are summer tires or winter tires based on the size of the judged values. In the apparatus for detecting decrease in air-pressure of a LSD vehicle, averages of judged values in the proximity of the straight line, at a left turn, and at a right turn are respectively obtained at initialization running with tires of normal internal pressure. These are set as reference values, and determination of decompression is performed based on amounts of deviation therefrom. In this embodiment, the reference value for the left turn is −0.2197 and the reference value for the right turn is 0.1237 for winter tires, and the reference value for the left turn is −0.0463 and the reference value for the right turn is 0.0605 for summer tires. Thus, at the time of discriminating tires, when the absolute values of reference values at the time of right and left turns are both not less than 0.1 as shown in FIG. 16, it is determined that the tires are winter tires, and otherwise, it is determined that the tires are summer tires.

In this manner, after discriminating through a discriminating means whether the tires attached to the driving shaft are summer tires or winter tires, it is determined whether an internal pressure of a tire has decreased for each region of the turning radius from the relationship between the reciprocals of the turning radiuses and the judged values, similarly to the preceding example.

As explained so far, according to the present invention, determination of decompression can be reliably performed in the proximity of a region at which the lateral axis is 0, since the judged values (DEL values) obtained while the differentiation is restricted are focused at points at which the lateral axis is 0, that is, on the vertical axis when the reciprocals of turning radiuses of the driving wheels are depicted on the lateral axis. Further, when a four-wheeled vehicle is equipped with a limited slip differential device, determination of decompression is more reliably performed by discriminating between summer tires and winter tires.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for detecting a decrease in tire air-pressure in which decrease in internal pressure of tires is detected based on rotational information obtained from tires attached to a four-wheeled vehicle, the apparatus comprising:
    a rotational information detecting means for detecting rotational information of each tire;
    a memory means for storing reference values of rotational information of each tire;
    a calculating means for calculating a reciprocal of the turning radius of the vehicle for each tire based on the rotational information detected by the detecting means and the reference values of rotational information of each tire; and
    a determining means for determining a decrease in internal pressure of each tire at each turning radius of the vehicle from a relationship between each reciprocal of the turning radius of the vehicle for each tire, the detected rotational information and the reference values of rotational information of each tire.

2. The apparatus of claim 1, wherein the four-wheeled vehicle is equipped with a limited slip differential device and the apparatus further includes a discriminating means for discriminating whether the tires are summer tires or winter tires from the relationship between the reciprocal of the turning radius of the vehicle and the reference values.

3. The apparatus of claim 2, wherein the memory means stores reference values for tires having a normal air pressure and the determining means determines a difference between the relationship between the reciprocal of the turning radius of the vehicle and the reference values for tires having a normal air pressure and the relationship between the reciprocal of the turning radius of the vehicle and the detected values in order to determine whether there is a decrease in internal pressure of the tires.

4. The apparatus of claim 3, wherein if the relationship between the reciprocal of the turning radius of the vehicle and the detected values is higher than the relationship between the reciprocal of the turning radius of the vehicle and the reference values, a decrease in internal pressure of the rear right or the front left tire is determined by the determining means, and if the relationship between the reciprocal of the turning radius of the vehicle and the detected values is lower than the relationship between the reciprocal of the turning radius of the vehicle and the reference values, a decrease in internal pressure of the rear left or the front right tire is determined by the determining means.

5. The apparatus of claim 1, wherein the memory means stores reference values for tires having a normal air pressure and the determining means determines a difference between the relationship between the reciprocal of the turning radius of the vehicle and the reference values for tires having a normal air pressure and the relationship between the reciprocal of the turning radius of the vehicle and the detected values in order to determine whether there is a decrease in internal pressure of the tires.

6. The apparatus of claim 5, wherein if the relationship between the reciprocal of the turning radius of the vehicle and the detected values is higher than the relationship between the reciprocal of the turning radius of the vehicle and the reference values, a decrease in internal pressure of the rear right or the front left tire is determined by the determining means, and if the relationship between the reciprocal of the turning radius of the vehicle and the detected values is lower than the relationship between the reciprocal of the turning radius of the vehicle and the reference values, a decrease in internal pressure of the rear left or the front right tire is determined by the determining means.

7. A method for detecting a decrease in tire air-pressure, comprising the steps of:
    storing reference values of rotation information for tires in a four-wheeled vehicle;
    detecting rotational information for tires on a four-wheeled vehicle;
    calculating a reciprocal of the turning radius of the vehicle for the tires from the detected rotational information and the reference values; and
    determining a decrease in the air-pressure of the tires at each turning radius of the vehicle from a relationship between the reciprocal of the turning radius of the vehicle calculated, the detected values and the reference values.

8. The method of claim 7, wherein the four-wheeled vehicle is equipped with a limited slip differential device, said method further comprising the step of discriminating whether the tires are summer tires or winter tires from the relationship between the reciprocal of the turning radius of the vehicle, the calculated values and the reference values.

9. The method of claim 8, wherein the step of storing further comprises storing reference values for tires having normal air pressure, and the step of determining further comprises determining a difference between the relationship between the reciprocal of the turning radius of the vehicle and the reference values for tires having a normal air pressure and the relationship between the reciprocal of the turning radius of the vehicle and the detected values in order to determine whether there is a decrease in the air pressure of the tires.

10. The method of claim 9, wherein if the relationship between the reciprocal of the turning radius of the vehicle and the detected values is higher than the relationship between the reciprocal of the turning radius of the vehicle and the reference values, the step of determining further comprises determining that the rear right or the front left tire has a decreased air pressure, and wherein if the relationship between the reciprocal of the turning radius of the vehicle and the detected values is lower than the relationship between the reciprocal of the turning radius of the vehicle and the reference values, the step of determining further comprises determining that the rear left or the front right tire has a decreased air pressure.

11. The method of claim 7, wherein the step of storing further comprises storing reference values for tires having normal air pressure, and the step of determining further comprises determining a difference between the relationship between the reciprocal of the turning radius of the vehicle and the reference values for tires having a normal air pressure and the relationship between the reciprocal of the turning radius of the vehicle and the detected values in order to determine whether there is a decrease in the air pressure of the tires.

12. The method of claim 11, wherein if the relationship between the reciprocal of the turning radius of the vehicle and the detected values is higher than the relationship between the reciprocal of the turning radius of the vehicle and the reference values, the step of determining further comprises determining that the rear right or the front left tire has a decreased air pressure, and wherein if the relationship between the reciprocal of the turning radius of the vehicle and the detected values is lower than the relationship between the reciprocal of the turning radius of the vehicle and the reference values, the step of determining further comprises determining that the rear left or the front right tire has a decreased air pressure.

* * * * *